United States Patent
Godler et al.

(10) Patent No.: US 6,840,118 B2
(45) Date of Patent: Jan. 11, 2005

(54) WAVE GEAR DEVICE TORQUE DETECTION METHOD

(75) Inventors: Ivan Godler, Fukuoka-ken (JP); Masashi Horiuchi, Nagano-ken (JP); Minoru Hashimoto, Nagano-ken (JP)

(73) Assignee: Harmonic Drive Systems Inc., Tokyo (JP)

( * ) Notice: Subject to any disclaimer, the term of this patent is extended or adjusted under 35 U.S.C. 154(b) by 0 days.

(21) Appl. No.: 10/419,959

(22) Filed: Apr. 22, 2003

(65) Prior Publication Data

US 2003/0230151 A1 Dec. 18, 2003

(30) Foreign Application Priority Data

May 13, 2002 (JP) ........................................ 2002-136890

(51) Int. Cl.⁷ .............................. G01L 3/02; G01L 3/14
(52) U.S. Cl. ............................. 73/862.325; 73/862.338
(58) Field of Search ...................... 73/862.325, 862.191, 73/862.391, 862.08, 862.381, 862.338, 862.02

(56) References Cited

U.S. PATENT DOCUMENTS 5,234,066 A * 8/1993 Ahsing et al. ................ 180/6.5
6,472,656 B2 * 10/2002 Arai ....................... 73/862.321

* cited by examiner

*Primary Examiner*—Edward Lefkowitz
*Assistant Examiner*—Lilybett Martir
(74) *Attorney, Agent, or Firm*—Burns, Doane, Swecker & Mathis, L.L.P.

(57) ABSTRACT

A wave gear device torque detection method in which the gain of the output of each of a plurality of strain gauge sets affixed to the diaphragm of a flexible external gear is amplified and the outputs are then combined to form a detection signal. Adjusting the gain of each of the strain gauge outputs makes it possible to compensate for rotational ripple included in the output. Compensation of up to n order ripple components is possible by using at least (2n+1) strain gauges.

4 Claims, 7 Drawing Sheets

Fundamental wave component compensation

Compensation
of
fundamental wave component and secondary component

WAVE GEAR DEVICE TORQUE DETECTION METHOD

BACKGROUND OF THE INVENTION

1. Field of the Invention

The present invention relates to a torque detection method for detecting the torque of the output shaft of a wave gear device. More particularly, the invention relates to a wave gear device torque detection method that uses a strain gauge affixed to the flexible external gear of a wave gear device to utilize the elastic deformation of the flexible external gear to detect the output shaft torque with good precision.

2. Description of the Prior Art

A wave gear device is composed of an annular rigid internal gear, a flexible external gear disposed inside the rigid internal gear and a wave generator disposed inside the flexible external gear that flexes the external gear radially to partially mesh the flexible external gear with the rigid internal gear and circumferentially rotate the meshing positions. The wave generator generally has an elliptical profile that flexes the flexible external gear into an elliptical shape. When the wave generator is rotated by a motor, the positions at which the two gears mesh move around the circumference, generating a relative rotation arising from the difference in the number of teeth. Therefore, by fixing one of the gears, a reduced-speed rotational output can be obtained from the other gear.

Figure 1:
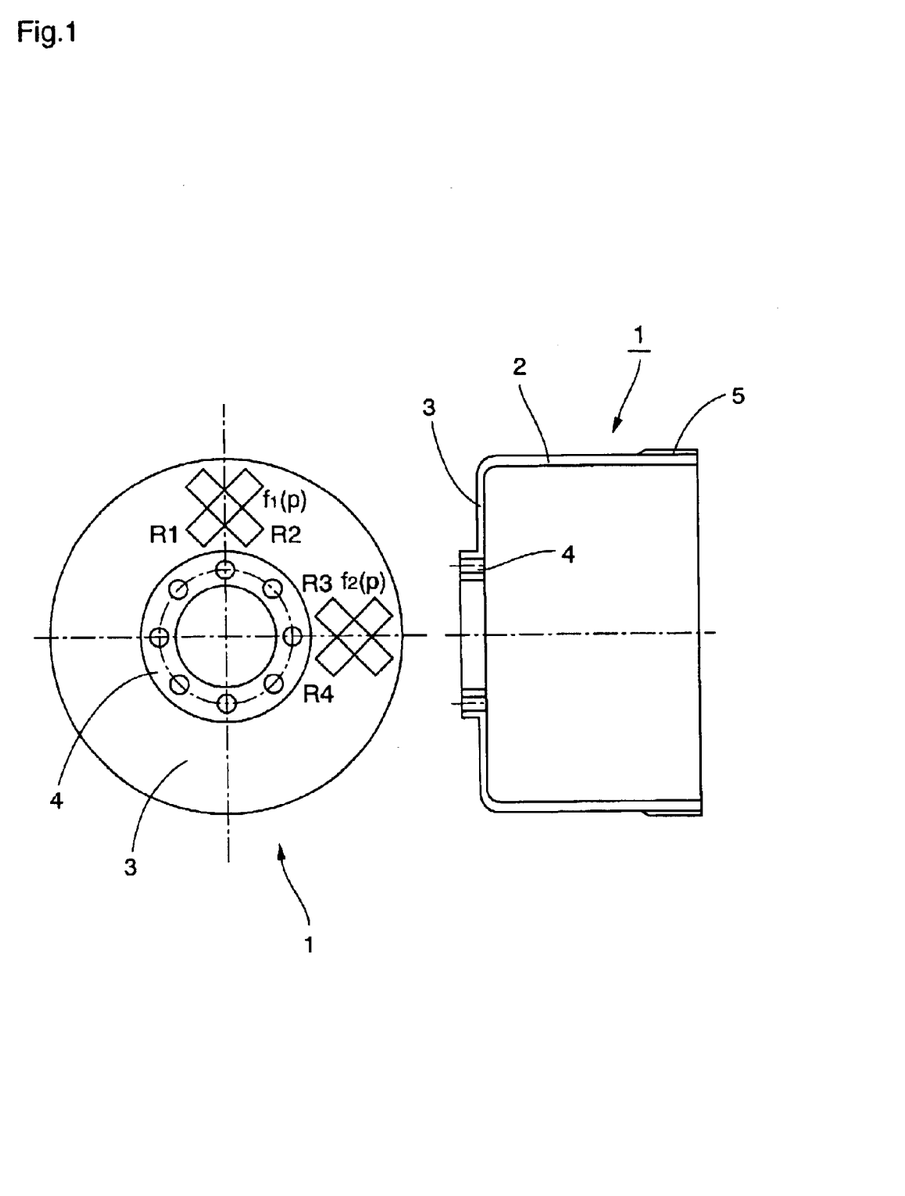
FIG. 1 is an explanatory view for explaining rotational ripple included in an output signal obtained using strain gauges for detecting transmission torque in a wave gear device.

One method of detecting the output torque of the wave gear device is to utilize the elastic deformation of the flexible external gear. As shown in FIG. 1, a cup-shaped flexible external gear 1 comprises a cylindrical body 2, an annular diaphragm 3 whose inner edge is continuous with an end of the body 2, and an annular boss 4 formed continuously from the center part of the diaphragm 3. External teeth 5 are formed integrally with the outer surface at the open end of the body 2 to run in the circumferential direction. The torque of the output shaft can be detected based on the outputs of strain gauges affixed to the cylindrical body 2 or diaphragm 3.

However, each part of the flexible external gear 1 is forcibly and repeatedly radially deformed by the flexing and rotation action of the wave generator. This generates strain in the flexible external gear 1 unrelated to the transmission torque. For each rotation of the wave generator, each part of the flexible external gear 1 undergoes two radial deformations having a fixed amplitude. Thus, with each rotation of the wave generator, this produces a two-cycle distortion of the sinusoidal fundamental period (each cycle being 180°), unrelated to the transmission torque.

In the prior art, as shown in the example of FIG. 1, a strain gauge group f1(p) (R1, R2) and a strain gauge group f2(p) (R3, R4) are placed on the surface of the flexible external gear 1, for example on the surface of the diaphragm 3, with a mutual offset of 90°, and the outputs used to cancel the fundamental period strain component. However, with this method the detection output does not have sufficient linearity and the detection output is left with rotational ripple components having short periods (that are an integral multiple of the fundamental period).

Figure 2:
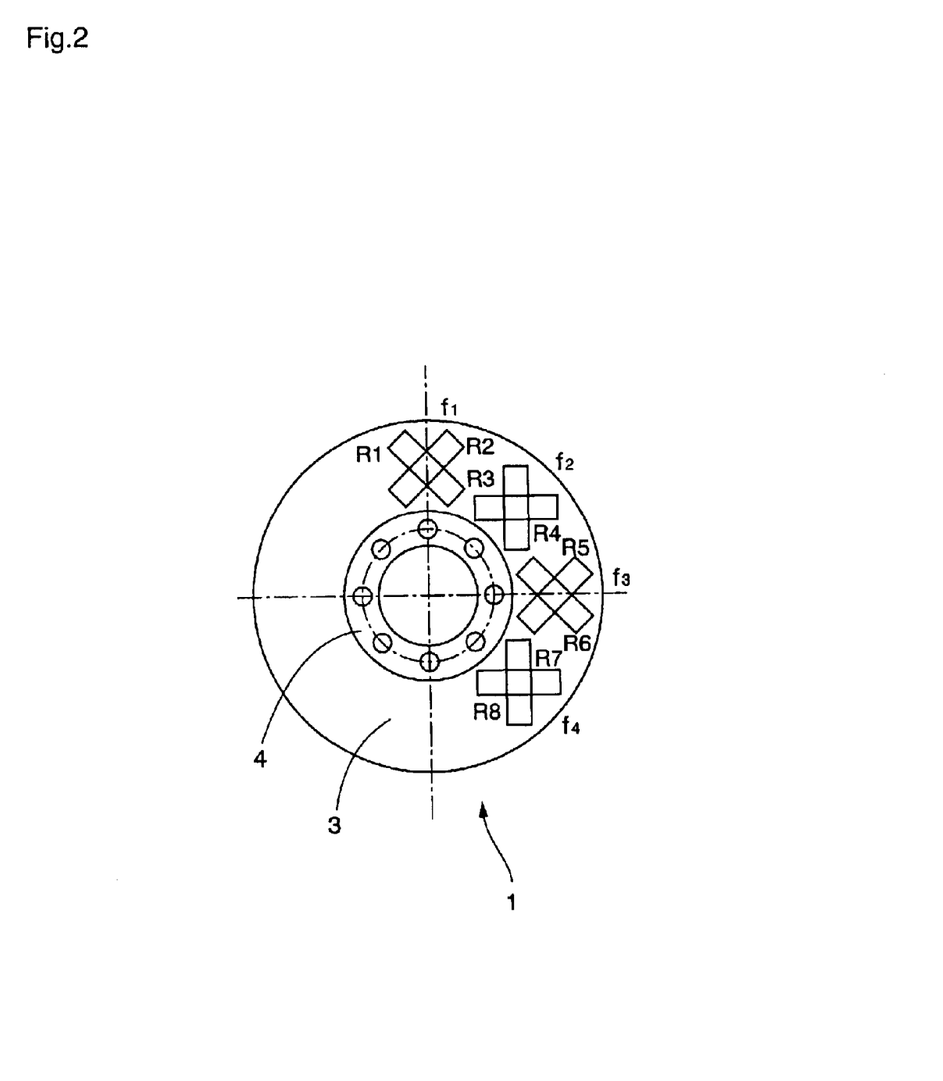
FIG. 2 is also an explanatory view for explaining rotational ripple included in an output signal obtained using strain gauges for detecting transmission torque in a wave gear device.

To cancel the fundamental period strain component and a secondary strain component (90°, cycle), the arrangement shown in FIG. 2 has been used in which a set of the strain gauges of groups f1 (R1, R2) and f2 (R3, R4) are disposed at 45° to each other, and another set of the strain gauges of groups f3 (R5, R6) and f4 (R7,R8) are disposed at 45° to each other in a manner that these two sets are disposed at 90° to each other, whereby the eight strain gauges R1 to R8 are placed on the diaphragm. To improve the output linearity, an arrangement also includes using sets of strain gauge groups (f1, f2) and (f3, f4) arranged symmetrically within 360°, for a total of sixteen strain gauges.

However, even with these configurations, rotational ripple compensation is still inadequate. Based on their experiments, the present inventors found that the main causes of such error are strain gauge positional errors, flexible external gear dimensional errors (asymmetries and the like), and gear assembly error. Errors in the positioning of the strain gauges, for example, give rise to differences in strain gauge signal sensitivity and phase that make it impossible to cancel or adequately control the rotational ripple.

An object of the present invention is to provide a wave gear device torque detection method that is able to remove or adequately control periodically fluctuating strain components (rotational ripple) produced in the flexible external gear with the rotation of the wave generator that are unrelated to transmission torque.

SUMMARY OF THE INVENTION

To attain the above and other objects, the present invention provides a torque detection method for detecting transmission torque in a wave gear device in which a flexible, circular external gear is radially flexed into partial engagement with a rigid, internal gear and positions of engagement between the two gears are moved in a circumferential direction to generate a relative rotation arising from a difference in the number of teeth of the two gears, said method comprising a step of adjusting gain of output signals of a plurality of strain gauges affixed to a surface of the flexible external gear, and a step of combining output signals of the strain gauges after adjustment of output signal gain, wherein the step of adjusting the gain comprises adjusting output signal gain of each strain gauge to enable removal or control of rotational ripple included in output signals of strain gauges produced by distortion of the flexible external gear that is unrelated to transmission torque.

The method also includes obtaining combined output signals of at least three strain gauges affixed to a surface of the flexible external gear at different angular positions in a peripheral direction.

The method also includes using at least (2n+1) strain gauges where n is order of rotational ripple components to be compensated for.

Further features of the invention, its nature and various advantages will be more apparent from the accompanying drawings and following detailed description of the invention.

DESCRIPTION OF THE PREFERRED EMBODIMENT

The wave gear device torque detection method according to the present invention will now be described with reference to the drawings.

Equation (1) expresses the rotational ripple component included in the output of strain gauge groups f1 to f4 affixed to the surface of the diaphragm 3 of the cup-shaped flexible external gear 1 at a prescribed angular spacing, as shown in FIG. 2. Note that equations (1) to (4) represent an example in which rotational ripple includes only secondary and quaternary components.

$$\begin{aligned} f_1(p) &= a_{11}\sin(2p+\psi_{11}) + a_{21}\sin(4p+\psi_{21}) \\ f_2(p) &= a_{12}\sin(2p+\psi_{12}) - a_{22}\sin(4p+\psi_{22}) \\ f_3(p) &= -a_{13}\sin(2p+\psi_{13}) + a_{23}\sin(4p+\psi_{23}) \\ f_4(p) &= -a_{14}\sin(2p+\psi_{14}) - a_{24}\sin(4p+\psi_{24}) \end{aligned} \quad (1)$$

where p: rotational angle of the wave generator,
  $f_1(p)$–$f_4(p)$: ripple component output of each strain gauge,
  $h(p)$: ripple component output included in composite output of the strain gauges,
  $a_{11}$–$a_{24}$: amplitude of each frequency component of each strain gauge, having error component,
  $\psi_{11}$–$\psi_{24}$: phase error of each frequency component of each strain gauge,
  $a_{ij}$: error included amplitude of i-order frequency component of the j-th strain gauge, and $\psi_{ij}$: phase error of i-order frequency component of the j-th strain gauge.

Equation (2) shows the conditions required to bring the sum $h(p)$ of the rotational ripple components to zero, which can also be expressed by a simultaneous equation, as in Equation (3).

$$\begin{aligned} h(p) = &(a_{11}\cos\psi_{11} - a_{12}\sin\psi_{12} - a_{13}\sin\psi_{13} + a_{14}\sin\psi_{14})\sin(2p) + \\ &(a_{11}\sin\psi_{11} + a_{12}\cos\psi_{12} - a_{13}\sin\psi_{13} - a_{14}\cos\psi_{14})\cos(2p) + \\ &(a_{21}\cos\psi_{21} - a_{22}\cos\psi_{22} + a_{23}\cos\psi_{23} - a_{24}\cos\psi_{24})\sin(4p) + \\ &(a_{21}\sin\psi_{21} - a_{22}\sin\psi_{22} + a_{23}\sin\psi_{23} - a_{24}\sin\psi_{24})\cos(4p) = 0 \end{aligned} \quad (2)$$

$$\begin{aligned} a_{11}\cos\psi_{11} - a_{12}\sin\psi_{12} - a_{13}\sin\psi_{13} + a_{14}\sin\psi_{14} &= 0 \\ a_{11}\sin\psi_{11} + a_{12}\cos\psi_{12} - a_{13}\sin\psi_{13} - a_{14}\cos\psi_{14} &= 0 \\ a_{21}\cos\psi_{21} - a_{22}\cos\psi_{22} + a_{23}\cos\psi_{23} - a_{24}\cos\psi_{24} &= 0 \\ a_{21}\sin\psi_{21} - a_{22}\sin\psi_{22} + a_{23}\sin\psi_{23} - a_{24}\sin\psi_{24} &= 0 \end{aligned} \quad (3)$$

To satisfy Equation (3), the amplitudes $a_{11}$ to $a_{24}$ or phases $\psi_{11}$ to $\psi_{24}$ can be adjusted. Although it is difficult for phases to be adjusted after the strain gauges are affixed, adjustment of amplitude can easily be carried out by adjusting the gain of the amplifier. For example, in order to compensate the rotational ripple of the fundamental period ripple, the gains $k_1$, $k_2$ and $k_3$ of the amplifier are adjusted to satisfy Equation (4).

$$\begin{aligned} k_1 a_{11}\cos\psi_{11} - k_2 a_{12}\sin\psi_{12} - k_3 a_{13}\cos\psi_{13} + a_{14}\sin\psi_{14} &= 0 \\ k_1 a_{11}\sin\psi_{11} + k_2 a_{12}\cos\psi_{12} - k_3 a_{13}\sin\psi_{13} - a_{14}\cos\psi_{14} &= 0 \end{aligned} \Rightarrow \begin{aligned} k_1 &= \cdots \\ k_2 &= \cdots \\ k_3 &= \cdots \end{aligned} \quad (4)$$

The gain parameters $k_1$, $k_2$ and $k_3$ can be adjusted by observing the composite ripple signal on a screen of a waveform measurement device and operating the volume thereof so that the ripple output becomes minimized. Alternatively, Equation (4) may be solved using a known simultaneous equation.

Next, the question of what is the minimum number of strain gauges required to fully compensate the rotational ripple is considered. Rotational ripple is generally expressed as in Equation (5) wherein n is number of rotational ripple components to compensate for and N is number of strain gauges (the number of strain gauge fixing positions disposed at equal angular intervals).

$$f_j(p) = \sum_{i=1}^{n} \sum_{j=1}^{N} a_{ij}\sin\left(2ip + \frac{(j-1)\pi}{N} + \psi_{ij}\right) \quad (5)$$

$$= \sum_{i=1}^{n} \sum_{j=1}^{N} \left\{ a_{ij}\cos\left(\frac{(j-1)\pi}{N} + \psi_{ij}\right)\sin(2ip) + a_{ij}\sin\left(\frac{(j-1)\pi}{N} + \psi_{ij}\right)\cos(2ip) \right\}$$

The linear simultaneous equation of Equation (6) must be satisfied to zero the rotational ripple defined by Equation (5).

$$\sum_{j=1}^{N} a_{ij} \cos\left(\frac{(j-1)\pi}{N} + \psi_{ij}\right) = 0 \Big|_{i=1}^{n} \quad (6)$$

$$\sum_{j=1}^{N} a_{ij} \sin\left(\frac{(j-1)\pi}{N} + \psi_{ij}\right) = 0 \Big|_{i=1}^{n}$$

In the present invention, the respective strain gauges j are added with the gain parameters $k_j$. In other words, the amplitude $a_{ij}$ is multiplied by the gain parameter $k_j$. Equation (6) can be modified as Equation (7).

$$\begin{bmatrix} a_{ij}\cos\left(\frac{(j-1)\pi}{N} + \psi_{ij}\right) \\ a_{ij}\sin\left(\frac{(j-1)\pi}{N} + \psi_{ij}\right) \end{bmatrix}_{(2n \times N)} [k_j]_{(N)} = 0 \quad (7)$$

The gain parameter for a non-trivial solution in the case of Equation (7) can be expressed by Equation (8).

$$N \geq 2n+1 \quad (8)$$

For example, when compensating for just the fundamental period component, n=1, so N is three or more, meaning three or more strain gauges are required. When compensating up to a secondary period component, n=2, so N will be five or more, meaning at least five strain gauges are required.

Figure 3:
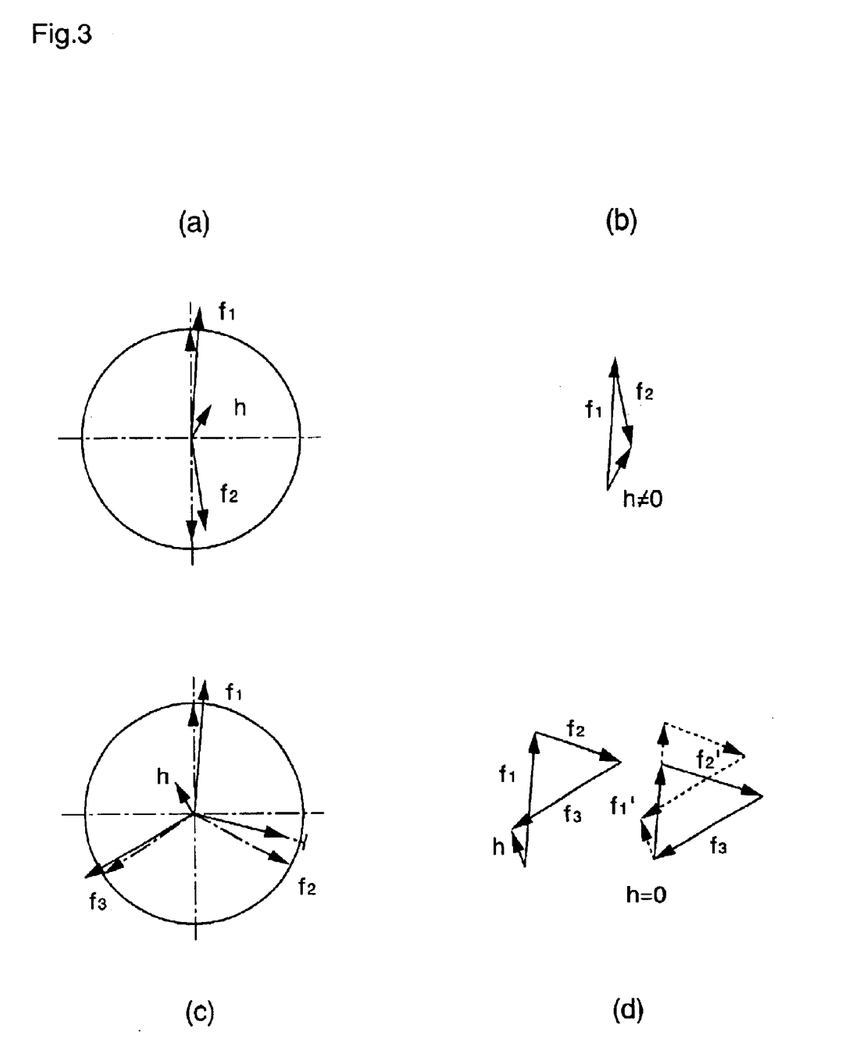
FIG. 3 is an explanatory view illustrating that at least three strain gauges are required to cancel a fundamental period component included in rotational ripple.

FIG. 3 shows the principle of the compensation of the fundamental period ripple. Ripple compensation is not possible using the two sets of strain gauges f1, f2 shown in FIGS. 3(a) and (b). Using the three sets of strain gauges f1, f2, f3 shown in FIGS. 3(c) and (d) and adjusting the gain of the strain gauges make it possible to fully compensate for the rotational ripple.

There are number of answers of the simultaneous equation (5), but where N=2n+1, one of the gain parameters can be freely selected. For example, one of the gain parameter can be set as "1", wherein one set of strain gauges requires no gain adjustment. When the gain parameter of the J-th strain gauge is set as "1", that is $k_j$=1, the remaining (N−1) gain parameters can be obtained by the following Equation (9).

$$[k_j]_{j \neq J} = -\begin{bmatrix} a_{ij}\cos\left(\frac{(j-1)\pi}{N} + \psi_{ij}\right) \\ a_{ij}\sin\left(\frac{(j-1)\pi}{N} + \psi_{ij}\right) \end{bmatrix}_{j \neq J}^{-1} \begin{bmatrix} a_{iJ}\cos\left(\frac{(J-1)\pi}{N} + \psi_{iJ}\right) \\ a_{iJ}\sin\left(\frac{(J-1)\pi}{N} + \psi_{iJ}\right) \end{bmatrix} \quad (9)$$

In order to maintain the total gain output after gain adjustment as that before gain adjustment, scaling is carried out according to Equation (10).

$$C = \frac{N}{\sum_{j=1}^{N} k_j} \quad (10)$$

In Equation (10), C is a scaling coefficient and the value of the obtained gain parameter $k'_j$ becomes $Ck_j$.

According to the present invention, ripple compensation can be carried out by simple balancing of the amplitude, and therefore can be realized either by analog or digital circuitry at a high operational speed.

Figure 4:
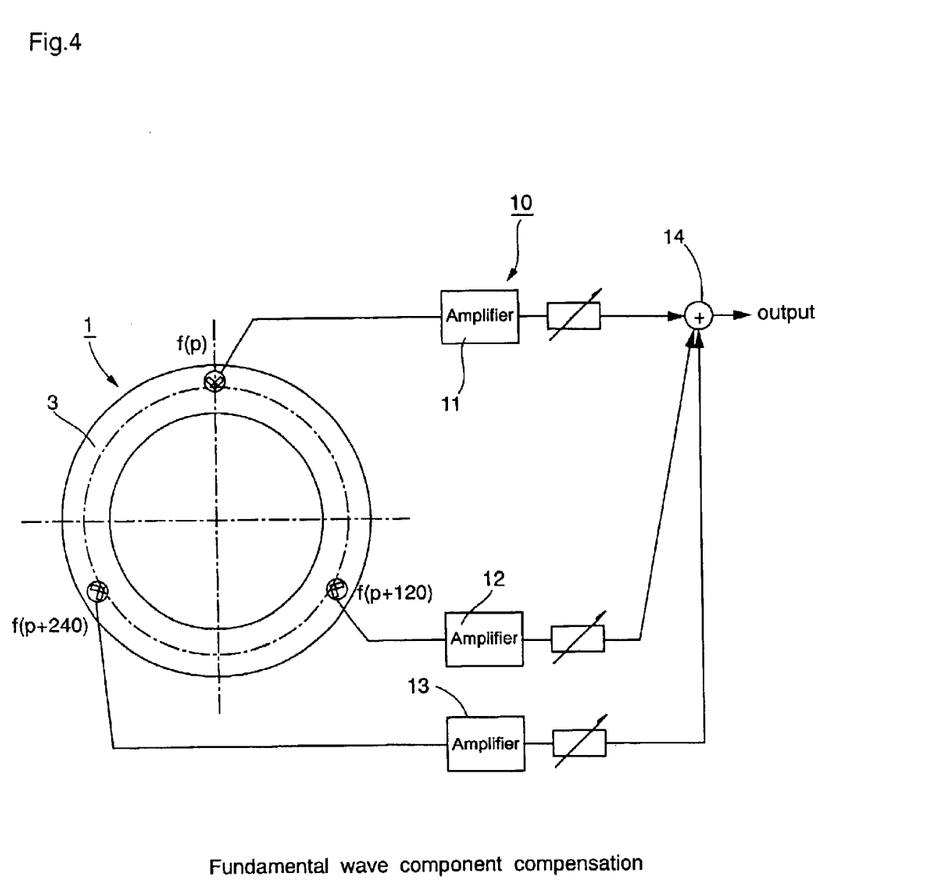
FIG. 4 is a schematic diagram showing the principal parts of the torque detection devices of a wave gear device according to the present invention.

FIG. 4 shows an example of a configuration of the wave gear device torque detection method based on a new fact ascertained by the present inventors. In the case of this torque detection means 10, three sets of strain gauges f(p), f(p+120) and f(p+240) are affixed to the surface of the diaphragm 3 of the cup-shaped flexible external gear 1 at intervals of 120°). Each set consists of two strain gauges fixed at right-angles to each other. After the gain of the output of each set of strain gauges has been adjusted by respective amplifiers 11, 12 and 13, the outputs are combined by an adder 14 and output as a detection signal. By using an appropriate gain adjustment as prescribed by Equation (4), it is possible to obtain an detection signal in which rotational ripple is fully compensated for.

Figure 5:
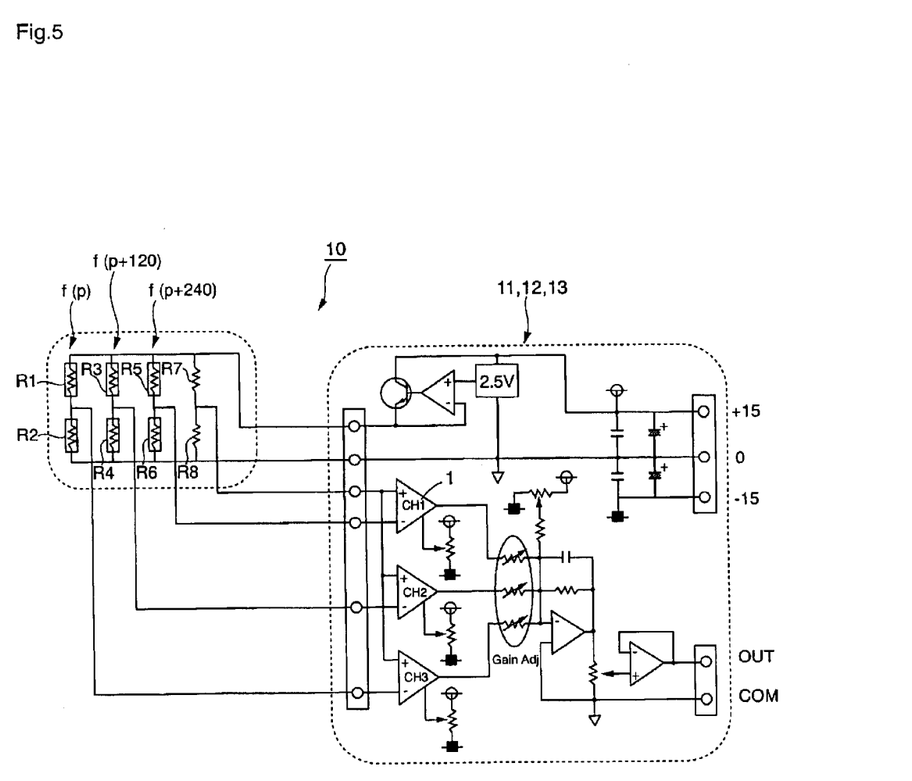
FIG. 5 is a schematic diagram of a specific example of the circuit configuration of the torque detection device of FIG. 4.

FIG. 5 is a schematic diagram of a specific example of the circuit configuration of the torque detection means 10. As shown, the detection section is in the form of a bridge circuit composed of the three sets of strain gauges f(p), f(p+120) and f(p+240), each comprised of a pair of strain gauges (R1, R2), (R3, R4), (R5, R6), positioned with the axes of each pair mutually orthogonally disposed, and a pair of fixed resistances R7 and R8.

Figure 6:
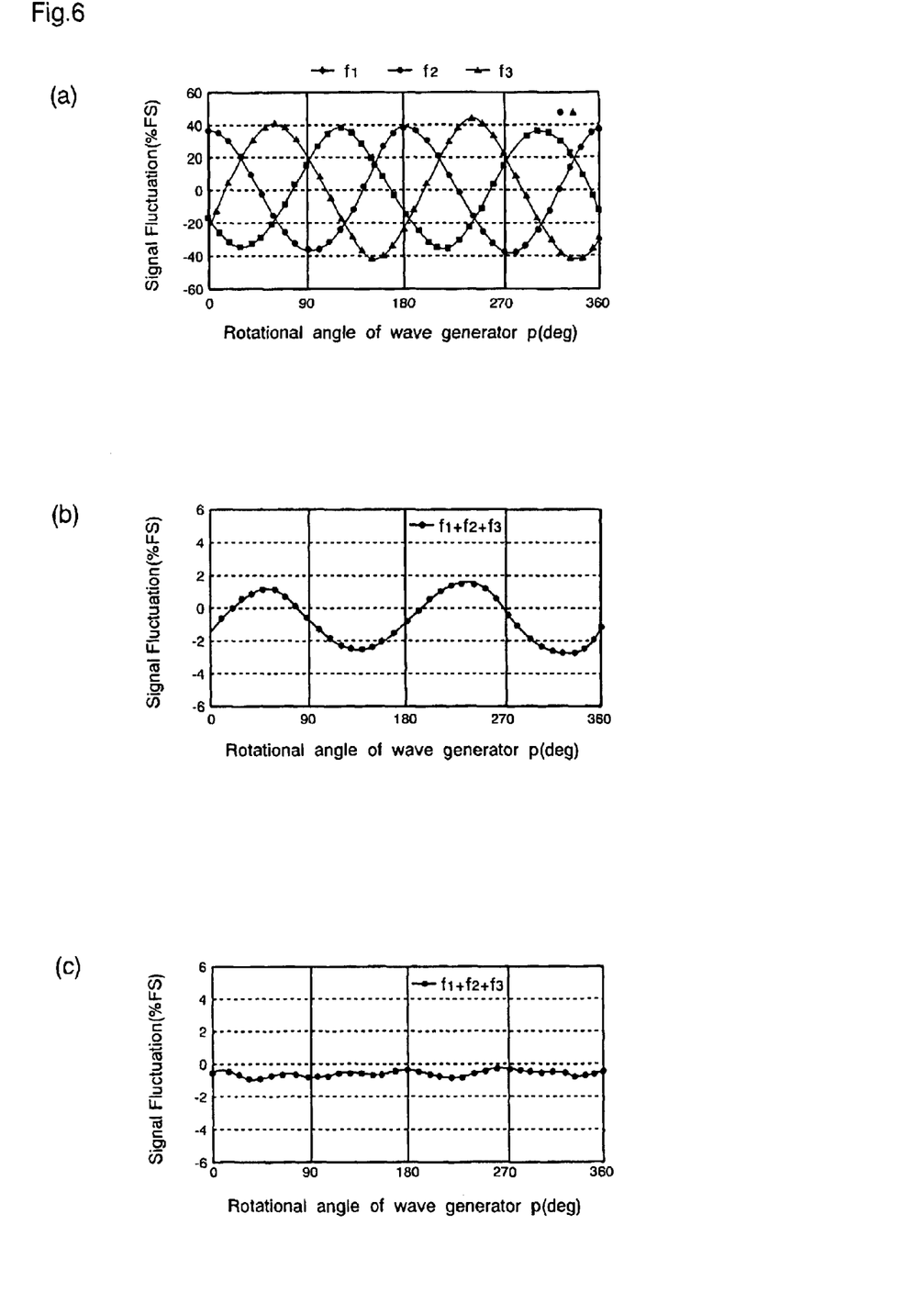
FIG. 6(a) shows the output fluctuation curve of three strain gauge sets plotted with respect to the rotation angle of the wave gear device.
FIG. 6(b) shows a composite output fluctuation curve obtained by combining the outputs.
FIG. 6(c) shows the composite output fluctuation curve following gain adjustment by the torque detection device of FIG. 5.

FIG. 6(a) shows the output fluctuation curves of the sets of strain gauges f(p), f(p+120) and f(p+240), respectively, plotted with respect to the rotation angle of the wave gear device; FIG. 6(b) is the composite output fluctuation curve obtained by combining the three outputs; and FIG. 6(c) shows the composite output fluctuation curve following gain adjustment by the torque detection means 10. A comparison of the curves of FIGS. 6(b) and (c) shows that from the torque detection means 10, there can be obtained a ripple-compensated detection signal.

In accordance with the above-described basic principle of the invention, the strain gauges only need to be positioned within an angular range of 180°, as shown in FIGS. 1 and 2. However, positioning the strain gauges within a 360° range, as in this example, also has the advantage of making it possible to compensate for one-period-per-rotation low-frequency components caused by rotational eccentricity.

Figure 7:
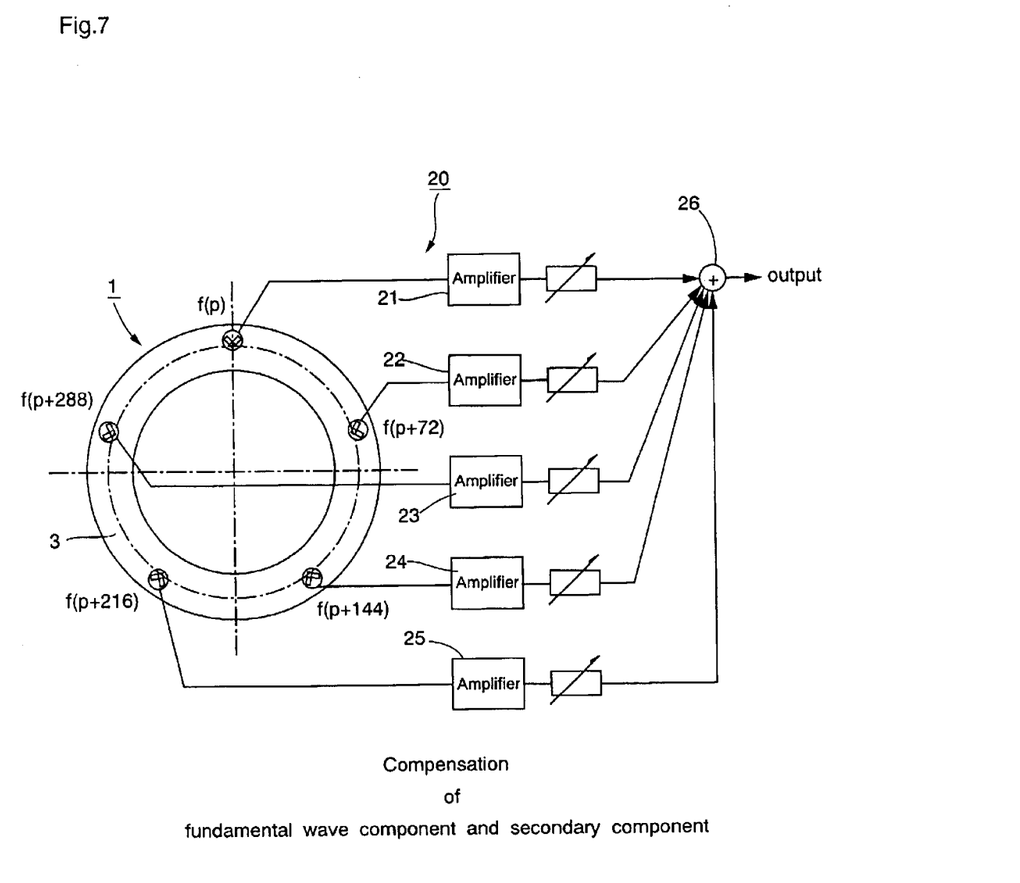
FIG. 7 is a schematic diagram showing the principal parts of the torque detection device of a wave gear device according to the present invention.

FIG. 7 is an example of a torque detection means for compensating for fundamental and secondary wave components included in rotational ripples. In the case of the torque detection means 20 of this example, n=2, so there are five sets of strain gauges, f(p), f(p+72), f(p+144), f(p+216) and f(p+288), spaced at equal angles on the surface of the diaphragm 3 of the cup-shaped flexible external gear 1. Each set consists of two strain gauges fixed at right-angles to each other. After the gain of the output of each set of strain gauges has been adjusted by respective amplifiers 21 to 25, the outputs are combined by an adder 26 and output as a detection signal. This makes it possible to obtain an output signal in which rotational ripple is fully compensated for.

As described in the foregoing, it was confirmed that in accordance with the wave gear device torque detection method of this invention, by combining the strain gauge outputs after adjusting the gain of each output, it is possible to compensate for rotational ripple in the strain gauge output, which is a periodical fluctuation component unrelated to the transmission torque.

The invention also makes it possible to establish the minimum number of strain gauges needed to compensate for other order components included in rotational ripple, and to use this to securely compensate for rotational ripple components up to the required order. To put it another way, the invention provides an efficient way of compensating for rotational ripple using the minimum number of strain gauges which, by eliminating the work of providing unnecessary strain gauges, helps to reduce the cost of the detection mechanism.

What is claimed is:

1. A torque detection method for detecting transmission torque in a wave gear device in which a flexible, circular external gear is radially flexed into partial engagement with a rigid, internal gear and positions of engagement between the two gears are moved in a circumferential direction to generate a relative rotation arising from a difference in the number of teeth of the two gears, said method comprising:

a step of adjusting gain of output signals of a plurality of strain gauges affixed to a surface of the flexible external gear, and a step of combining output signals of strain gauges after adjustment of output signal gain, wherein the step of adjusting the gain comprises adjusting output signal gain of each strain gauge to enable removal or control of rotational ripple included in output signals of strain gauges produced by distortion of the flexible external gear that is unrelated to transmission torque.

2. A method according to claim 1 that further includes obtaining combined output signals of at least three strain gauges affixed to a surface of the flexible external gear at different angular positions in a peripheral direction.

3. A method according to claim 2 that further includes using at least (2n+1) strain gauges where n is order of rotational ripple components to be compensated for.

4. A method according to claim 1 that further includes using at least (2n+1) strain gauges where n is order of rotational ripple components to be compensated for.

* * * * *